(12) United States Patent
Aaron et al.

(10) Patent No.: US 10,007,977 B2
(45) Date of Patent: Jun. 26, 2018

(54) TECHNIQUES FOR PREDICTING PERCEPTUAL VIDEO QUALITY

(71) Applicant: NETFLIX, INC., Los Gatos, CA (US)

(72) Inventors: Anne Aaron, Menlo Park, CA (US);
Dae Kim, San Jose, CA (US);
Yu-Chieh Lin, Alhambra, CA (US);
David Ronca, Campbell, CA (US);
Andy Schuler, San Jose, CA (US);
Kuyen Tsao, Foster City, CA (US);
Chi-Hao Wu, El Monte, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days. days.

(21) Appl. No.: 14/709,230

(22) Filed: May 11, 2015

(65) Prior Publication Data

US 2016/0335754 A1 Nov. 17, 2016

(51) Int. Cl.
G06K 9/00 (2006.01)
G06T 7/00 (2017.01)
G06T 9/00 (2006.01)
H04N 21/466 (2011.01)
H04N 19/154 (2014.01)
G06T 7/20 (2017.01)

(52) U.S. Cl.
CPC ............. *G06T 7/0002* (2013.01); *G06T 7/20* (2013.01); *G06T 9/002* (2013.01); *H04N 19/154* (2014.11); *H04N 21/466* (2013.01); *H04N 21/4666* (2013.01); *G06T 2207/10016* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

2002/0090134 A1 7/2002 Van Zon
2005/0286802 A1* 12/2005 Clark .................... H04N 5/232
382/286

(Continued)

OTHER PUBLICATIONS

International Search Report Application No. PCT/US2016/031477, dated Jul. 5, 2016, 16 pages.

(Continued)

*Primary Examiner* — Hadi Akhavannik
(74) *Attorney, Agent, or Firm* — Artegis Law Group, LLP

(57) ABSTRACT

In one embodiment of the present invention, a quality trainer and quality calculator collaborate to establish a consistent perceptual quality metric via machine learning. In a training phase, the quality trainer leverages machine intelligence techniques to create a perceptual quality model that combines objective metrics to optimally track a subjective metric assigned during viewings of training videos. Subsequently, the quality calculator applies the perceptual quality model to values for the objective metrics for a target video, thereby generating a perceptual quality score for the target video. In this fashion, the perceptual quality model judiciously fuses the objective metrics for the target video based on the visual feedback processed during the training phase. Since the contribution of each objective metric to the perceptual quality score is determined based on empirical data, the perceptual quality score is a more accurate assessment of observed video quality than conventional objective metrics.

21 Claims, 5 Drawing Sheets

(56) References Cited

U.S. PATENT DOCUMENTS

| | | | |
|---|---|---|---|
| 2006/0268980 A1* | 11/2006 | Le Dinh | H04N 17/004 375/240.01 |
| 2007/0257988 A1* | 11/2007 | Ong | H04N 17/004 348/182 |
| 2012/0155765 A1* | 6/2012 | Joshi | G06K 9/036 382/172 |
| 2013/0027568 A1 | 1/2013 | Zou | |
| 2014/0078320 A1* | 3/2014 | Hong | H04N 5/217 348/208.1 |

OTHER PUBLICATIONS

Engelke et al. "An Artificial Neural Network for Quality Assessment in Wireless Imaging Based on Extraction of Structural Information", 2007 IEEE International Conference on Acoustics, Speech, and Signal Processing Apr. 15-20, 2007 Honolulu, HI, USA, IEEE, Piscataway, NJ, USA, Apr. 15, 2007 (Apr. 15, 2007), pp. I-1249, XP031463095, ISBN: 978-1-4244-0727-9 the whole document.

Vranjes M et al: "Locally averaged PSNR as a simple objective Video Quality Metric", ELMAR, 2008. 50th International Symposium, IEEE, Piscataway, NJ, USA, Sep. 10, 2008 (Sep. 10, 2008), pp. 17-20, XP031406293, ISBN: 978-1-4244-3364-3 p. 18, paragraph 2.3.

* cited by examiner

TECHNIQUES FOR PREDICTING PERCEPTUAL VIDEO QUALITY

BACKGROUND OF THE INVENTION

Field of the Invention

Embodiments of the present invention relate generally to computer science and, more specifically, to techniques for predicting perceptual video quality.

Description of the Related Art

Efficiently and accurately encoding source video is essential for real-time delivery of video content. After the encoded video content is received, the source video is decoded and viewed or otherwise operated upon. Some encoding processes employ lossless compression algorithms, such as Huffman coding, to enable exact replication of the source. By contrast, to increase compression rates and/or reduce the size of the encoded video content, other encoding processes leverage lossy data compression techniques that eliminate selected information, typically enabling only approximate reconstruction of the source. Further distortion may be introduced during resizing operations in which the video is scaled-up to a larger resolution to match the dimensions of a display device.

Manually verifying the quality of delivered video is prohibitively time consuming. Consequently, to ensure an acceptable video watching experience, efficiently and accurately predicting the quality of delivered video is desirable. Accordingly, automated video quality assessment is often an integral part of the encoding and streaming infrastructure—employed in a variety of processes such as evaluating encoders and fine-tune streaming bitrates to maintain video quality.

In one approach to assessing the quality of encoded videos, a full-reference quality metric, such as peak signal-to-noise ratio (PSNR), is used to compare the source video to the encoded video. However, while such metrics accurately reflect signal fidelity (i.e., the faithfulness of the encoded video to the source video), these metrics do not reliably predict human perception of quality. For example, fidelity measurements typically do not reflect that visual artifacts in still scenes are likely to noticeably degrade the viewing experience more than visual artifacts in fast-motion scenes. Further, due to such perceptual effects, such fidelity metrics are content-dependent and, therefore, inconsistent across different types of video data. For example, fidelity degradation in action movies that consist primarily of fast-motion scenes is less noticeable than fidelity degradation in slow-paced documentaries.

As the foregoing illustrates, what is needed in the art are more effective techniques for predicting the perceived quality of videos.

SUMMARY OF THE INVENTION

One embodiment of the present invention sets forth a computer-implemented method for estimating perceptual video quality. The method includes selecting a set of objective metrics that represent a plurality of deterministic video characteristics; for each training video included in a set of training videos, receiving a data set that describes the training video, where the data set includes a subjective value for a perceptual video quality metric and a set of objective values for the set of objective metrics; from the data sets, deriving a composite relationship that determines a value for the perceptual video quality metric based on a set of values for the set of objective metrics; for a target video, calculating a first set of values for the set of objective metrics; and applying the composite relationship to the first set of values to generate an output value for the perceptual video quality metric.

One advantage of the disclosed techniques for estimating perceptual video quality is that the composite relationship that defines the perceptual video quality metric fuses objective metrics based on direct, human observations. More specifically, because human feedback for a set of training videos guides the contribution of each of the objective metrics, applying the composite relationship to target videos generalizes human feedback. Consequently, the perceptual video quality metric reliably predicts perceived video quality. By contrast, conventional quality metrics typically measure signal fidelity—a characteristic that does not necessarily track video quality as perceived by human vision systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
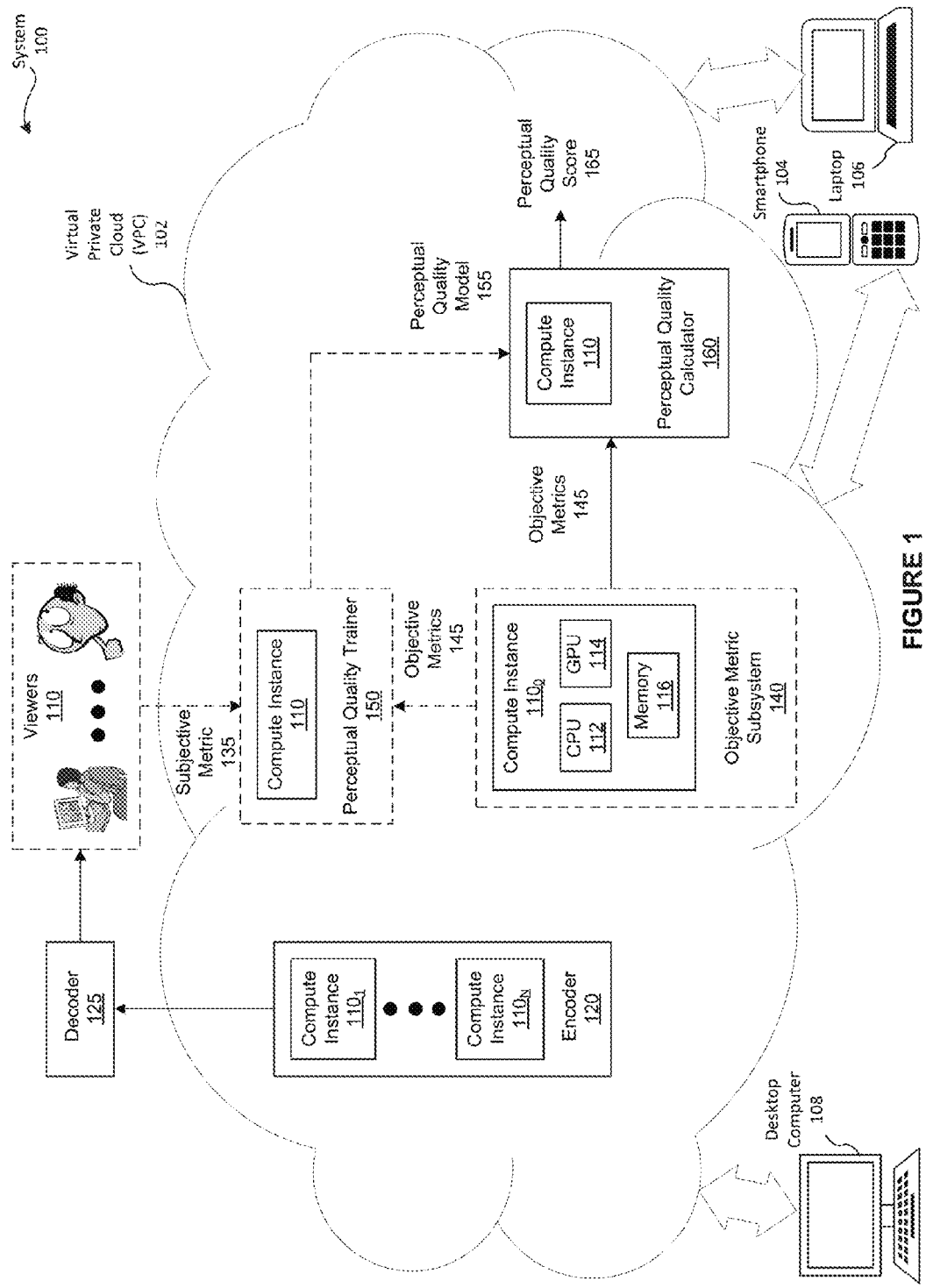
FIG. 1 is a conceptual illustration of a system configured to implement one or more aspects of the present invention.

FIG. 1 is a conceptual illustration of a system 100 configured to implement one or more aspects of the present invention. As shown, the system 100 includes a virtual private cloud (i.e., encapsulated shared resources, software, data, etc.) 102 connected to a variety of devices capable of transmitting input data and/or displaying video. Such devices include, without limitation, a desktop computer 102, a smartphone 104, and a laptop 106. In alternate embodiments, the system 100 may include any number and/or type of input, output, and/or input/output devices in any combination.

The virtual private cloud (VPC) 100 includes, without limitation, any number and type of compute instances 110. The VPC 100 receives input user information from an input device (e.g., the laptop 106), one or more computer instances 110 operate on the user information, and the VPC 100 transmits processed information to the user. The VPC 100 conveys output information to the user via display capabilities of any number of devices, such as a conventional cathode ray tube, liquid crystal display, light-emitting diode, or the like.

In alternate embodiments, the VPC 100 may be replaced with any type of cloud computing environment, such as a public or a hybrid cloud. In other embodiments, the system 100 may include any distributed computer system instead of the VPC 100. In yet other embodiments, the system 100 does not include the VPC 100 and, instead, the system 100 includes a single computing unit that implements multiple processing units (e.g., central processing units and/or graphical processing units in any combination).

As shown for the compute instance $110_0$, each compute instance 110 includes a central processing unit (CPU) 112, a graphics processing unit (GPU) 114, and a memory 116. In operation, the CPU 112 is the master processor of the compute instance 110, controlling and coordinating operations of other components included in the compute instance 110. In particular, the CPU 112 issues commands that control the operation of the GPU 114. The GPU 114 incorporates circuitry optimized for graphics and video processing, including, for example, video output circuitry. In various embodiments, GPU 114 may be integrated with one or more of other elements of the compute instance 110. The memory 116 stores content, such as software applications and data, for use by the CPU 112 and the GPU 114 of the compute instance 110.

In general, the compute instances 110 included in the VPC 100 are configured to implement one or more applications. As shown, compute instances $110_1$-$110_N$ are configured as an encoder 120. The encoder 120 implements any type of data compression techniques as known in the art and in any technically feasible fashion. In some embodiments, the encoder 140 is a parallel chunk encoder that partitions the source data into multiple chunks and then performs data compression techniques concurrently on the chunks.

To comply with resource constraints, such as encoded data size limitations and available streaming bandwidth, the encoder 120 implements lossy data compression techniques that eliminate selected information. By eliminating information, the encoder 120 creates "compression" artifacts that introduce distortions when the source data is reconstructed. The visual quality of the reconstructed source data is often further compromised by other elements included in the transcoding pipeline (i.e., the applications that translate the source data in one format to the reconstructed data in another format). For example, "scaling" artifacts may be introduced during the process of down-scaling and encoding the source data and then up-scaling the decoded data to the source resolution at the display device.

To ensure an acceptable viewing experience, the quality of the reconstructed data and, indirectly, the caliber of the elements included in the transcoding pipeline are typically evaluated at various points in the design and delivery process using quality metrics. The values for the quality metrics are then used to guide the development of applications (e.g., encoders) and the real-time optimization of content delivery, such as stream-switching algorithms that are quality-aware.

Many widely applied quality metrics (e.g., mean-squared-error (MSE) and peak signal-to-noise ratio (PSRN)) measure fidelity—the faithfulness of the reconstructed data to the source data. However, fidelity measurements do not reflect psycho-visual phenomena affecting the human visual system (HVS) such as masking, contrast sensitivity, or the highly structured content in natural images. Further, due to such imperfectly reflected perceptual effects, such fidelity metrics are content-dependent—the values are not comparable across different types of video data. For instance, video with grain noise is relatively heavily penalized in PSNR although the visual impact detectable by human viewers is relatively low. In general, conventional quality metrics are not a reliable indication of the visual quality as perceived by humans and, therefore, the acceptability of the viewing experience.

For this reason, one or more of the compute instances 110 in the VPC 102 implement machine learning techniques to institute a consistent perceptual quality metric. Notably, a perceptual quality score 165 (i.e., value for the perceptual quality metric) correlates in a universal manner to subjective human visual experience irrespective of the type of video content. Any type of learning algorithm as known in the art may be leveraged to implement the consistent perceptual quality metric. In some embodiments, a support vector machine (SVM) provides the framework for the consistent perceptual quality metric. In other embodiments, a neural network implements the algorithms to establish the consistent perceptual quality metric.

In a training phase, depicted in FIG. 1 with dotted lines, a perceptual quality trainer 150 creates a perceptual quality model 155. The perceptual quality model 155 is a supervised learning model that combines objective metrics 145 to optimally track the values for the subjective metric 135 assigned during viewings of training data. The objective metric subsystem 140 generates the objective metrics 145 based on comparison operations between the training data and the corresponding encoded training data. Such objective metrics 145 are referred to as full-reference quality indices, and may be generated in any technically feasible fashion. After a decoder 125 generates reconstructed training data from the encoded training data, viewers 110 watch the reconstructed data on display devices, such as the screen of the laptop 106, and personally rate the visual quality—assigning values to the subjective metric 135.

The perceptual quality trainer 150 receives the calculated values for the objective metrics 145 and the human-assigned values for the subjective metric 135. The perceptual quality trainer 150 then trains the perceptual quality model 155 based on these metrics. More specifically, the perceptual quality trainer 150 executes learning algorithms that recognize patterns between the objective metrics 145 and the subjective metric 135. Subsequently, the perceptual quality trainer 150 configures the perceptual quality model 155 to fuse values for the objective metrics 145 into a perceptual quality score 165 that reflects the value for the subjective metric 135 and, consequently, the experience of the viewers 110.

In a scoring phase, depicted in FIG. 1 with solid lines, a perceptual quality calculator 160 receives the perceptual quality model 155 and the values for the objective metrics 145 for target data. The perceptual quality calculator 160 applies the perceptual quality model 155 to the values for the objective metrics 145 and generates the perceptual quality score 165 for the target data. The values for the objective metrics 145 may be generated in any technically feasible fashion. For example, the objective metric subsystem 140 may compare any reference data (e.g., source data) to any derived target data (e.g., encoded source data) to calculate the values for the objective metrics 145.

Training Phase

Figure 2:
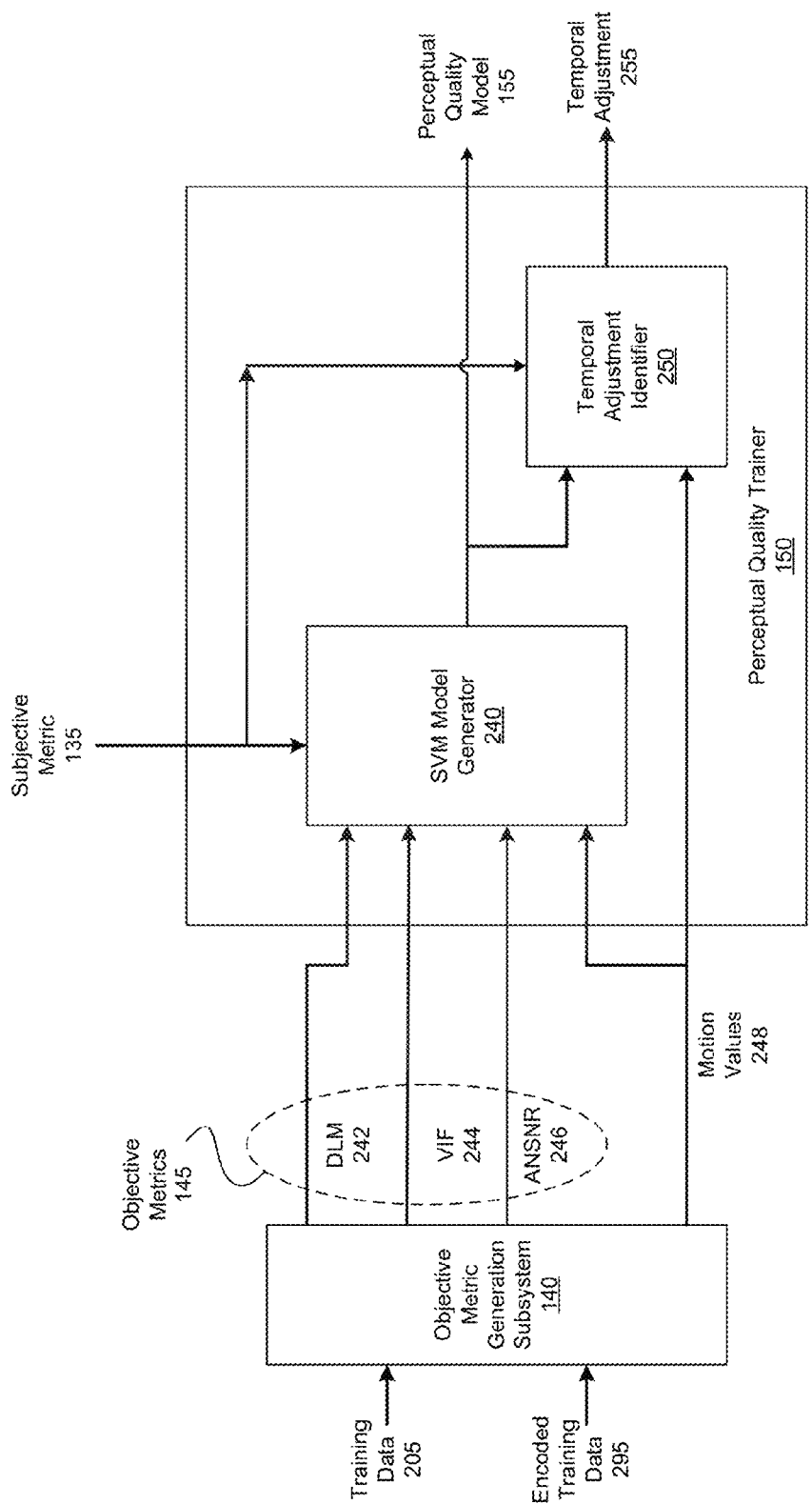
FIG. 2 is a block diagram illustrating the objective metric generation subsystem and the perceptual quality trainer of FIG. 1, according to one embodiment of the present invention.

FIG. 2 is a block diagram illustrating the objective metric generation subsystem 140 and the perceptual quality trainer 150 of FIG. 1, according to one embodiment of the present invention. The objective metric generation subsystem 140 may be implemented in any technically feasible fashion and may include any number of separate applications that each generates any number of values for the objective metrics 145. The perceptual quality trainer 150 includes, without limitation, a support vector machine (SVM) model generator 240 and a temporal adjustment identifier 250.

Upon receiving training data 205 and encoded training data 295 for a set of training videos, the objective metric generation subsystem 140 computes the values for the objective metrics 145. The training videos may include any number and length of video clips that represent the range of video types to be represented by the perceptual quality score 165. For example, in one embodiment the video clips in the training set span a diverse range of high level features (e.g., animation, sports, indoor, camera motion, face close-up, people, water, obvious salience, object number) and low level characteristics (e.g. film grain noise, brightness, contrast, texture, motion, color variance, color richness, sharpness).

In some embodiments the set of training videos is the MCL-V video database of video clips that is available publically from the University of Southern California. In other embodiments, the ML-V video database of video clips is supplemented with selected high film grain clips and animation titles to increase the diversity and the robustness of the set of training videos. The training data 205 includes the training videos and the encoded training data 295 is derived from the training data 205. More specifically, for each of the clips included in the training data 205, the encoder 150 is configured to encode the clip repeatedly, at a variety of different resolutions and/or quality levels (i.e., bitrates). In this fashion, a predetermined number of encoded clips are generated from each video clip in the training set and these encoded clips form the encoded training data 295.

In general, each video quality metric exhibits both strengths and weaknesses. To leverage the strengths and mitigate the weaknesses, the objective metric generation subsystem 140 is configured to calculate a set of the objective metrics 145 that, together, provide valuable insight into the visual quality across the range of the encoded training data 295. The selection of the objective metrics 145 may be made in any technically feasible fashion to address any number of anticipated artifacts. For instance, in some embodiments, the objective metrics 145 are empirically selected to assess degradation caused by compression (i.e., blockiness) and scaling (i.e. blurriness).

As shown, the objective metrics 145 include a detail loss measure (DLM) 242, a visual information fidelity (VIF) 244, and an anti-noise signal-to-noise ratio (ANSNR) 246. The DLM 242 is based on applying wavelet decomposition to identify the blurriness component of signals. The DLM 242 is relatively good at detecting blurriness in intermediate quality ranges, but is relatively poor at discriminating quality in higher quality ranges. The VIF 244 is based on applying a wavelet transformation to analyze signals in the frequency domain. The VIF 244 is relatively good at detecting slight bluing artifacts, but is relative poor at detecting blocking artifacts.

The ANSNR 246 is designed to mitigate some drawbacks of SNR for film content. Prior to performing the SNR calculation, the objective metric generation subsystem 140 applies a weak low-pass filter to the training data 205 and a stronger low-pass filter to the encoded training data 295. The ANSNR 246 is relatively fast to compute and good for detecting compression artifacts and strong scaling artifacts. However, the ANSNR 246 ignores slight blurring artifacts and, consequently, is not sensitive to minor quality changes in the high quality ranges.

As a further optimization, since the human visual system is less sensitive to degradation during periods of high motion, the objective metric generation subsystem 140 computes motion values 248. For each frame, the object metric generation subsystem 140 computes the motion value 248 as the mean co-located pixel difference of the frame with respect to the previous frame. Notably, to reduce the likelihood that noise is misinterpreted as motion, the object metric generation subsystem 140 applies a low-pass filter before performing the difference calculation.

The values for the subjective metric 135 are assigned by the viewers 110 after watching the training data 205 and decoded versions of the encoded training data 295, referred to herein as reconstructed training data, on any number and type of display devices. In one embodiment, each of the viewers 110 watch each training clip side-by-side with each of the reconstructed training clips and assigns values to the subjective metric 135. The value for the subjective metric 135 is an absolute value that indicates the perceived visual quality. For instance, in one embodiment, the value for the subjective metric 135 may vary from 0 through 100. A score of 100 indicates that the reconstructed training clip appears identical to the training clip. A score below 20 indicates that the reconstructed training clip loses significant scene structure and exhibits considerable blurring relative to the training clip.

Subsequently, the SVM model generator 240 receives the motion values 248, values for the objective metrics 145, and values for the subjective metric 135 for the encoded training data 295. The SVM model generator 240 then applies learning algorithms to train the perceptual quality model 150. For the encoded training data 295, the SMV model generator 240 identifies correlations between the observed values for the subjective metric 135 and the calculated values for the objective metrics 145 as well as the motion values 248. The SVM model generator 240 then generates the perceptual quality model 155—a fusion of the objective metrics 135 and the motion value 248 that estimates the subjective metric 135. As persons skilled in the art will recognize, the SVM model generator 240 may implement any of a number of learning algorithms to generate any type of model. In alternate embodiments, the SVM model generator 240 may be replaced with any processing unit that implements any type of learning algorithm, such as a neural network.

The temporal adjustment identifier 250 is configured to tune the perceptual quality model 155 for corner cases. Notably, for very high motion scenes (i.e., high motion values 248), the perceptual quality model 155 may not adequately represent temporal masking effects. Consequently, the temporal adjustment identifier 250 generates a temporal adjustment 255 that is applied to the perceptual quality model 155 for such scenes. In some embodiments, the temporal adjustment 255 includes a threshold and a percentage. The temporal adjustment 255 is applied in conjunction with the perceptual quality model 155, increasing the perceptual quality score 165 computed via the perceptual quality model 155 by the percentage.

Scoring Phase

Figure 3:
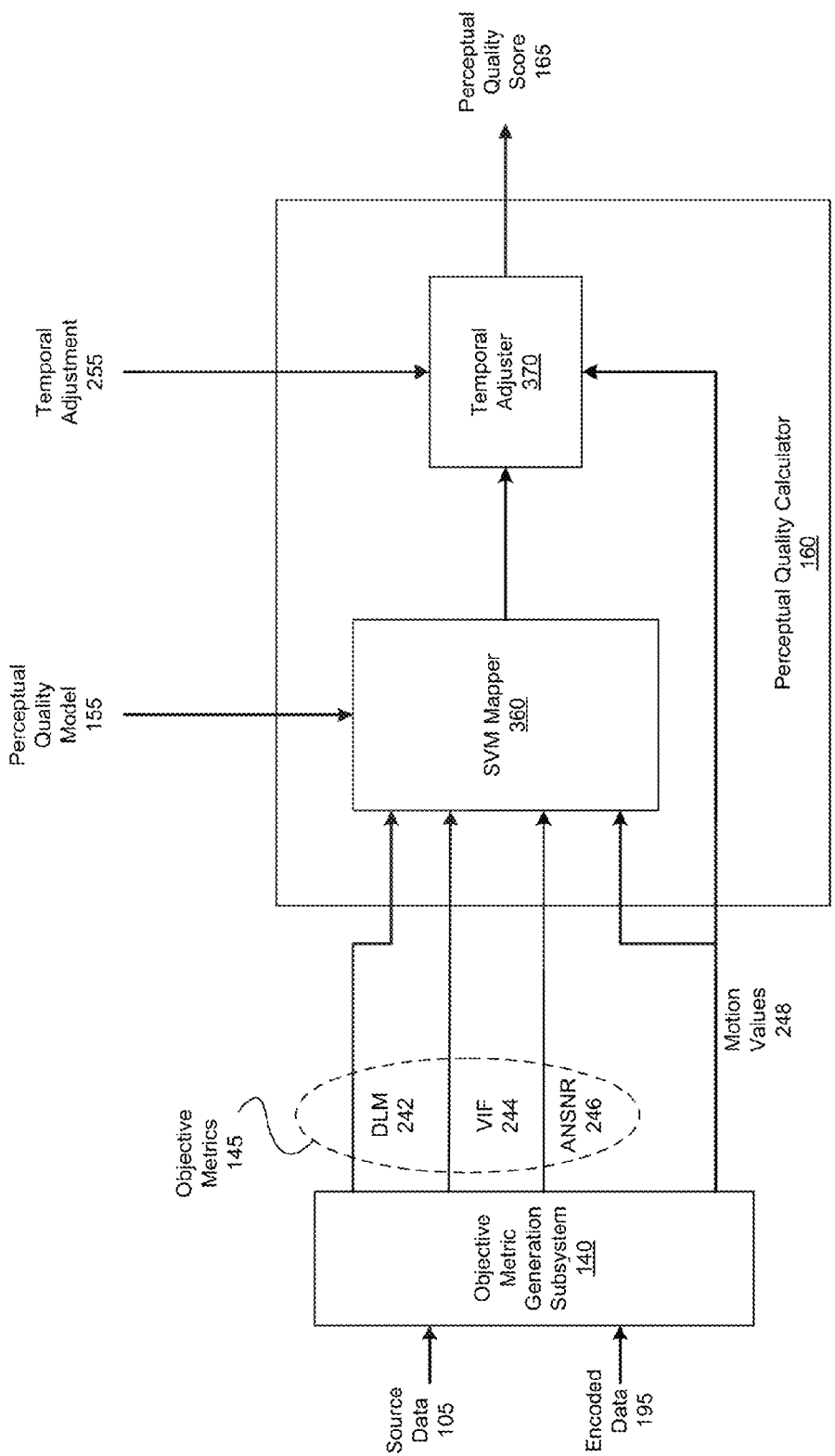
FIG. 3 is a block diagram illustrating the objective metric generation subsystem and the perceptual quality calculator of FIG. 1, according to one embodiment of the present invention.

FIG. 3 is a block diagram illustrating the objective metric generation subsystem 140 and the perceptual quality calculator 160 of FIG. 1, according to one embodiment of the present invention. As shown, the perceptual quality calculator 150 includes, without limitation, a support vector machine (SVM) mapper 360 and a temporal adjuster 370. The perceptual quality calculator 150 operates during the scoring phase—computing perceptual quality scores 165 for the encoded data 195 that is derived from the source data 105 based on the "trained" perceptual quality model 155 and the temporal adjustment 255.

The SVM mapper 360 may be configured with any number of perceptual quality models 155 and temporal adjustments 255 that correspond to any number of training data 105. In some embodiments, a model selection module (not shown) classifies training data 105 of similar content into groups and then assigns the perceptual quality model 155 based on the content of the encoded data 195 to be assessed. For example, one set of training data 105 may include relatively high quality videos and, therefore, the corresponding perceptual quality model 155 is optimized to determine the perceptual quality score 165 for high quality encoded data 195. By contrast, another set of training data 105 may include relatively low quality videos and, therefore, the corresponding perceptual quality model 155 is optimized to determine the perceptual quality score 165 for low quality encoded data 195.

Upon receiving the source data 105 and the encoded data 195 derived from the source data 105, the objective metric generation subsystem 140 computes the values for the objective metrics 145 and the motion values 248. In general, the values for the objective metrics 145 and the motion values 248 may be determined in any technically feasible fashion. For instance, some embodiments include multiple objective metric calculators, and each objective metric calculator configures a different objective metric.

The SVM mapper 360 applies the perceptual quality model 155 to the objective metrics 145 and the motion values 248 to generate a perceptual quality score 165. Subsequently, the temporal adjuster 370 selectively applies the temporal adjustment 255 to the perceptual quality score 165 to fine-tune corner cases. In one embodiment, the temporal adjuster 370 compares the motion values 240 to a threshold included in the temporal adjustment 255. If the motion value 240 exceeds the threshold, then the temporal adjuster 370 increases the perpetual quality score 165 by a percentage included in the temporal adjustment 255 to reflect the inherent pessimism of the perceptual quality model 155 for high motion scenes. Because the perceptual quality model 155 and the temporal adjustment 255 track quality observed by the viewers 110, the perceptual quality score 165 reflects the quality of the encoded data 185 when viewed by humans.

Note that the techniques described herein are illustrative rather than restrictive, and may be altered without departing from the broader spirit and scope of the invention. In particular, the perceptual quality trainer 150 may be replaced with any module that implements any number of machine learning processes to generate a model that fuses multiple objectively calculated values to track an experimentally observed visual quality. Correspondingly, the perceptual quality calculator 160 may be replaced with any module that applies the model in a consistent fashion. Further, the perceptual quality trainer 150 may include any number of adjustment identification modules designed to fine-tune the generated model, and the perceptual quality calculator 160 may include any number of adjustment calculators that apply the identified adjustments.

The granularity (e.g., per frame, per scene, per shot, per 6 minute clip, etc.) of the training data 105, the objective metrics 145, the subjective metrics 135, and the motion values 245 may be vary within and between implementations. As persons skilled in the art will recognize, conventional mathematical techniques (e.g., averaging, extrapolating, interpolating, maximizing, etc.) may be applied to the objective metrics 145, the subjective metrics 135, and/or the motion values 245 in any combination to ensure measurement unit consistency. Further, the perceptual quality trainer 150 and the perceptual quality calculator 160 may be configured to determine the perceptual quality model 155, the temporal adjustment 255, and/or the perceptual quality score 160 at any granularity.

Predicting Human-Perceived Quality

Figure 4:
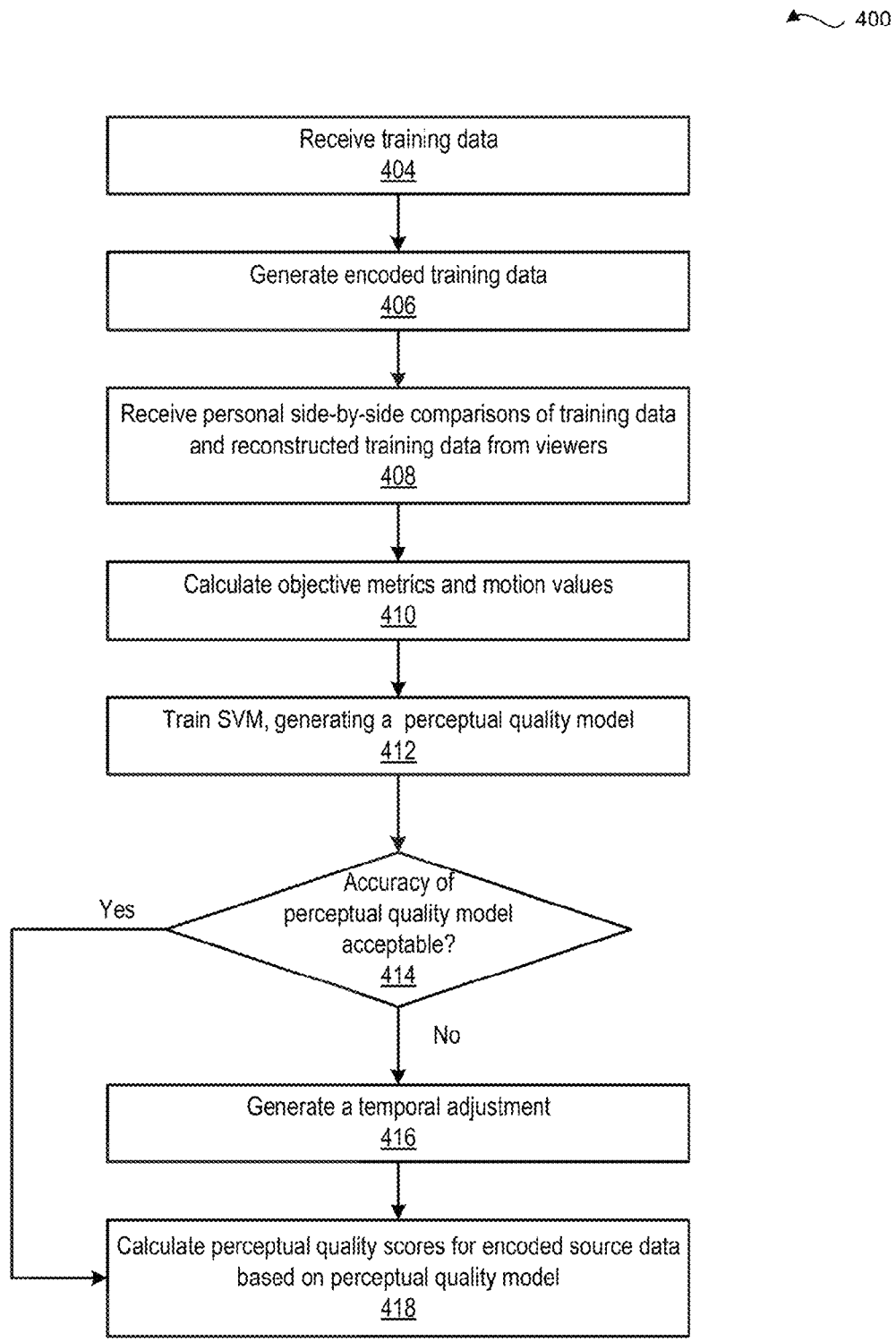
FIG. 4 is a flow diagram of method steps for predicting perceptual visual quality, according to one embodiment of the present invention.

FIG. 4 is a flow diagram of method steps for predicting perceptual visual quality, according to one embodiment of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the perceptual quality trainer 150 receives the training data 205. The training data 205 may include any number and length of video clips. For example, in one embodiment the training data 205 includes sixteen six minute clips. At step 406, the encoder 120 derives the encoded test data 295 from the training data 205 for any number of resolutions and combination of bit rates. In general, the resolutions and bit rates are selected to reflect target supported ranges for viewing devices and/or streaming bandwidth.

At step 406, the perceptual quality trainer 150 receives values for the subjective metric 135 for reconstructed video clips ((i.e., decoded, scaled, etc.) derived from the encoded training data 295. The perceptual quality trainer 150 may obtain values for the subjective metric 135 in any form and may perform any number of post-processing operations (e.g., averaging, removal of outlying data points, etc.). In alternate embodiments, the perceptual quality trainer 150 may receive and process data corresponding to any number of subjective metrics 135 in any technically feasible fashion.

For example, in some embodiments, the perceptual quality trainer 150 receives feedback generated during a series of side-by-side, human (e.g., by the viewers 100) comparisons of the training data 205 and the reconstructed video clips (i.e., decoded, scaled, etc.) derived from the encoded training data 295. For each of the reconstructed video clips, the feedback includes a value for the subjective metric 135 for the corresponding encoded test data 295. The value of the subjective metric 135 reflects the average observed visual quality based on an absolute, predetermined, quality scale (e.g., 0-100, where 100 represents no noticeable artifacts).

At step 410, the objective metric generation subsystem 140 computes values for the objective metrics 145 for the encoded test data 295 based on both the encoded test data 295 and the training data 205. The objective metric generation subsystem 140 may select the objective metrics 145 and then compute the values for the objective metrics 145 in any technically feasible fashion. For example, in some embodiments the objective metric generation subsystem 140 is configured to compute values for the detail loss measure (DLM) 242, the visual information fidelity (VIF) 244, and the anti-noise signal-to-noise ratio (ANSNR) 246.

As part of step 410, the objective metric generation subsystem 140 may also compute any other type of spatial or temporal data associated with the encoded test data 295. In particular, the objective metric generation subsystem 140 calculates the motion values 248 for each frame included in the encoded test data 295—the temporal visual difference.

At step 412, the support vector machine (SVM) model generator 240 performs machine learning operations—training the perceptual quality model 155 to track the values for the subjective metric 135 based on a fusion of the values for the objective metrics 145 and the motion values 248. At step 414, the perceptual quality trainer 150 determines whether the perceptual quality model 155 accurately tracks the values for the subjective metric 135 during periods of high motion, If, at step 414, the perceptual quality trainer 150 determines that the accuracy of the perceptual quality model 155 is acceptable, then this method proceeds directly to step 418.

If, at step 414, the perceptual quality trainer 150 determines that the accuracy of the perceptual quality model 155 is unacceptable, then this method proceeds to step 416. At step 416, the temporal adjustment identifier 250 determines a threshold beyond which the perceptual quality score 165 computed based on the perceptual quality model 155 is unacceptably pessimistic. The temporal adjustment identifier 250 also determines a percentage increase that, when applied to the perceptual quality score 165 computed based on the perceptual quality model 155, improves the accuracy of the perceptual quality score 165. Together, the threshold and the percentage increase form the temporal adjustment 255.

At step 418, the perceptual quality calculator 160 calculates the perceptual quality scores 165 for the encoded data 195 based on the perceptual quality model 165 and, when present, the temporal adjustment 255. In general, the perceptual quality calculator 160 computes the perceptual quality score 165 by applying the perceptual quality model 155 to the values for the objective metrics 155 and the motion values 248 for the encoded data 195 in any technically feasible fashion.

For example, in some embodiments, the perceptual quality calculator 150 performs the method steps outlined below in conjunction with FIG. 5—leveraging the trained perceptual quality model 155 to obtain perceptual quality scores 165 (i.e., values of the subjective metric 135). Notably, during the training phase the perceptual quality model 165 directly incorporates human feedback for the training data 205. Subsequently, during the scoring phase the trained perceptual quality model 165 enables the generalization of this human feedback to any number and type of source data 105.

Figure 5:
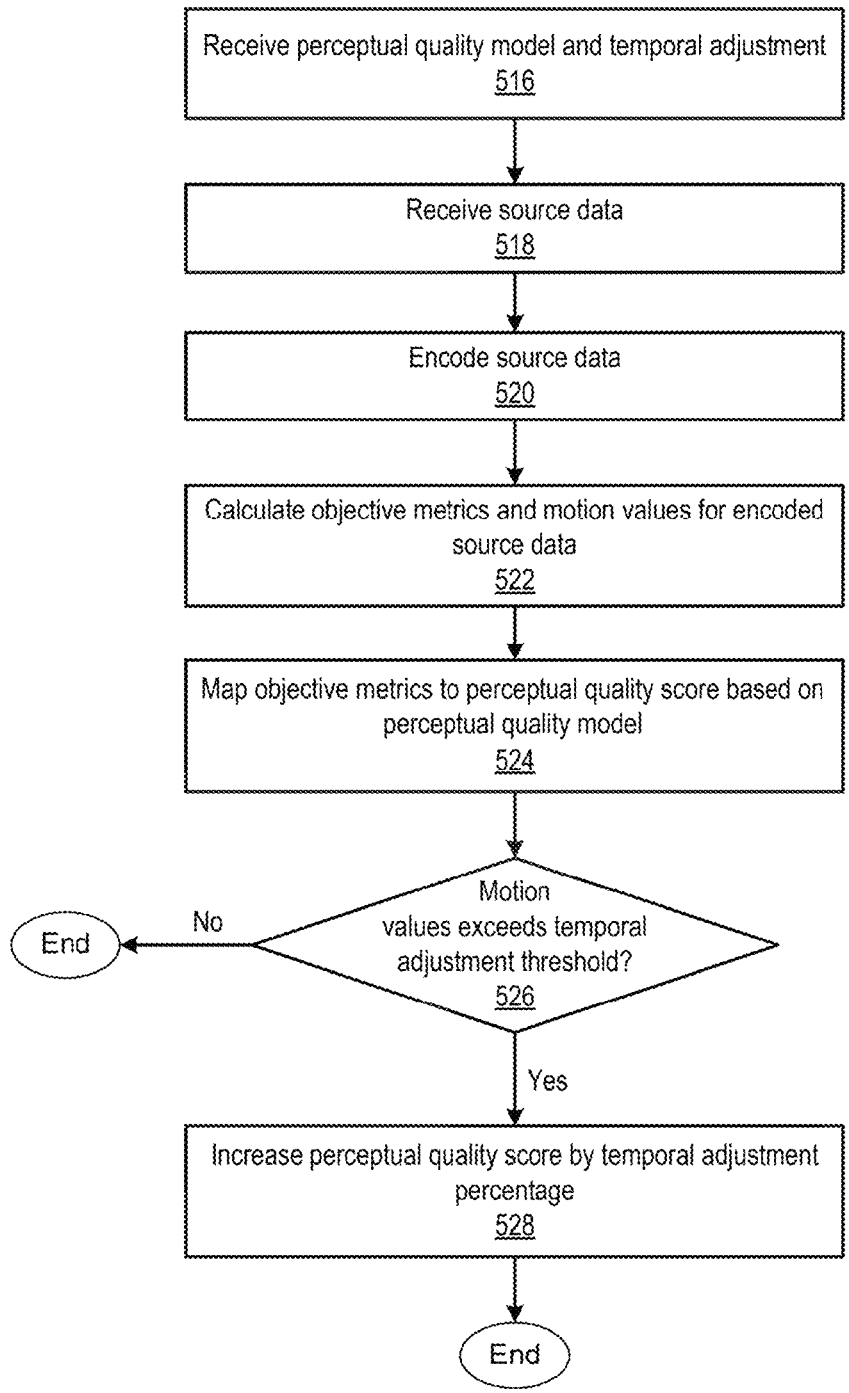
FIG. 5 is a flow diagram of method steps for calculating values for a perceptual visual quality score based on an empirically trained model, according to one embodiment of the present invention.

FIG. 5 is a flow diagram of method steps for calculating values for a perceptual visual quality score based on an empirically trained model, according to one embodiment of the present invention. Although the method steps are described with reference to the systems of FIGS. 1-3, persons skilled in the art will understand that any system configured to implement the method steps, in any order, falls within the scope of the present invention.

As shown, a method 500 begins at step 516, where the perceptual quality calculator 160 receives the perceptual quality model 155 and the temporal adjustment 255. In alternate embodiments, the temporal adjustment 255 may be omitted. In other embodiments, the temporal adjustment 255 is replaced with any number of other adjustments that are designed to fine-tune the perceptual quality score 165. The perceptual quality model 155 may be generated in any technically feasible fashion. For example, in some embodiments, the perceptual quality trainer 140 performs the method steps 406-416 outlined in FIG. 4.

At step 518, the perceptual quality calculator 160 receives the source data 105. At step 520, the encoder 120 derives the encoded data 195 from the source data 205 for a target resolution and/or bit rate. At step 522, the objective metric generation subsystem 140 computes values for the objective metrics 145 for the encoded data 195 based on the encoded data 195 and, for optionally, the source data 105. The objective metric generation subsystem 140 also computes the motion values 248 for each frame of the encoded data 195. In general, the perceptual quality calculator 160 is configured to calculator the values for the independent variables in the perceptual quality model 155.

At step 524, the support vector machine (SVM) mapper 360 applies the perceptual quality model 155 to the values for the objective metrics 145 and the motion values 248 for the encoded data 195 to generate the perceptual quality score 165. At step 526, the temporal adjuster 370 determines whether the motion values 248 of one or more frames exceed the threshold specified in the temporal adjustment 255. If, at step 526, the temporal adjuster 370 determines that none of the motion values 248 exceed the threshold, then the perceptual quality calculator 160 considers the perceptual quality score 165 to accurately predict the expected viewing experience and the method 500 ends.

If, at step 526, the temporal adjuster 370 determines that any of the motion values 248 exceed the threshold, then the temporal adjuster 370 considers the frames to reflect a period of high motion, and the method 500 proceeds to step 526. At step 526, the temporal adjuster 370 increases the perceptual quality score 165 by a threshold percentage (specified in the temporal adjustment 255) to compensate for the pessimism of the perceptual quality model 155 during periods of high motion, and the method 500 ends.

In sum, the disclosed techniques may be used to efficiently and reliably predict perceptual video quality. A perceptual quality trainer implements a support vector machine (SVM) to generate a perceptual quality model. Notably, for a training set of videos, the SVM is configured to fuse values for a set of objective metrics and temporal motion into a perceptual quality score—a subjective visual quality score that is based on human video-viewing feedback. Subsequently, a perceptual quality calculator applies the perceptual quality model to values for the objective metrics and temporal motion for target videos to generate corresponding values for the perceptual quality metric (i.e., visual quality score).

Advantageously, training the perceptual quality model using direct observations made by human visual systems enables the perceptual quality calculator to efficiently calculate quality scores that reliably predict perceived video quality in an absolute manner. By contrast, conventional quality metrics typically measure signal fidelity—a content-dependent, inconsistent, and unreliable indication of real world viewing appreciation. Further, by separating the initial empirically-based training phase from the subsequent per-video deterministic calculation phase, the disclosed techniques are expeditious and scalable. Consequently the perceptual quality model both reduces the time required to develop and accurately evaluate encoders and enables time-sensitive encoding applications, such as real-time quality-aware stream-switching.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for estimating perceptual video quality, the method comprising:
    selecting a set of objective metrics that represent a plurality of deterministic video characteristics;
    for each training video included in a set of training videos, receiving a subjective value for a perceptual video quality metric and a set of objective values for the set of objective metrics, wherein the subjective value and the set of objective values describe the training video;
    deriving a composite relationship based on a correlation between the subjective value, the set of objective values, and a measure of pixel motion within at least one of the set of training videos, wherein the composite relationship specifies a level of contribution for at least one of the set of objective metrics to the perceptual video quality metric;
    for a target video, calculating a first set of values for the set of objective metrics; and
    applying the composite relationship to the first set of values to generate an output value for the perceptual video quality metric.

2. The computer-implemented method of claim 1, wherein deriving the composite relationship comprises performing one or more training operations on the data sets.

3. The computer-implemented method of claim 2, wherein performing one or more training operations on a given data set comprises applying a support vector machine algorithm or an artificial neural network algorithm to the set of objective values included in the data set.

4. The computer-implemented method of claim 1, further comprising:
    determining that a value included in the first set of values exceeds a predetermined threshold; and
    modifying the output value for the perceptual quality metric based on an adjustment factor.

5. The computer-implemented method of claim 1, further comprising:
    computing a motion value based on pixel differences between two consecutive frames of the target video;
    determining that the motion value exceeds a predetermined threshold; and increasing the output value for the perceptual quality metric by a predetermined amount.

6. The computer-implemented method of claim 1, wherein the set of objective metrics includes at least one of detail loss measure and visual information fidelity.

7. The computer-implemented method of claim 1, wherein the set of objective metrics includes an anti-noise signal-to-noise ratio, the target video is derived from a source video, and calculating a first value for the anti-noise signal-to-noise ratio comprises:
  applying a first low pass filter to the source video;
  applying a second low pass filter to the target video that is stronger than the first low pass filter; and
  performing one or more signal-to-noise ratio calculations based on the filtered source video and the filtered target video.

8. The computer-implemented method of claim 1, wherein a first training video included in the set of training videos includes at least one of compressed data and scaled data.

9. The computer-implemented method of claim 1, wherein a first subjective value for the perceptual video quality metric is a human-observed score for the visual quality of a reconstructed video that is derived from the first training video.

10. A non-transitory computer-readable storage medium including instructions that, when executed by a processing unit, cause the processing unit to estimate perceptual video quality by performing the steps of:
  selecting a set of objective metrics that represent a plurality of deterministic video characteristics;
  for each training video included in a set of training videos, receiving a subjective value for a perceptual video quality metric and a set of objective values for the set of objective metrics, wherein the subjective value and the set of objective values describe the training video;
  deriving a composite relationship based on a correlation between the subjective value, the set of objective values, and a measure of pixel motion within at least one of the set of training videos, wherein the composite relationship specifies a level of contribution for at least one of the set of objective metrics to the perceptual video quality metric;
  for a target video, calculating a first set of values for the set of objective metrics; and
  applying the composite relationship to the first set of values to generate an output value for the perceptual video quality metric.

11. The non-transitory computer-readable storage medium of claim 10, wherein deriving the composite relationship comprises performing one or more training operations on the data sets.

12. The non-transitory computer-readable storage medium of claim 10, further comprising:
  computing a motion value based on pixel differences between two consecutive frames of the target video;
  determining that the motion value exceeds a predetermined threshold; and
  increasing the output value for the perceptual quality metric by a predetermined amount.

13. The non-transitory computer-readable storage medium of claim 10, wherein a first training video included in the set of training videos includes compressed data derived from a first original video.

14. The non-transitory computer-readable storage medium of claim 13, wherein a first subjective value for the perceptual video quality metric indicates the variation between a visual quality of the first original video and a visual quality of a reconstructed training video that is derived from the first training video based on one or more decompression operations.

15. The non-transitory computer-implemented method of claim 13, wherein a first subjective value for the perceptual video quality metric is a human-observed score for the visual quality of a video that is derived from the first training video based on one or more decompression operations.

16. The non-transitory computer-implemented method of claim 1, wherein the set of objective metrics includes an anti-noise signal-to-noise ratio, the target video is derived from a source video, and calculating a first value for the anti-noise signal-to-noise ratio comprises:
  applying a first low pass filter to the source video;
  applying a second low pass filter to the target video that is stronger than the first low pass filter; and
  performing one or more signal-to-noise ratio calculations based on the filtered source video and the filtered target video.

17. The non-transitory computer-readable storage medium of claim 10, wherein the composite relationship is an equation.

18. The non-transitory computer-readable storage medium of claim 17, wherein applying the composite relationship to the first set of values comprises solving the equation for the values included in the first set of values.

19. A system configured to estimate perceptual video quality based on a set of objective metrics that represent a plurality of deterministic video characteristics, the system comprising:
  an encoder configured to generate a set of training videos from a plurality of original videos;
  a perceptual quality trainer configured to:
    for each training video included in a set of training videos, receive a subjective value for a perceptual video quality metric and a set of objective values for the set of objective metrics, wherein the subjective value and the set of objective values describe the training video;
    deriving a composite relationship based on a correlation between the subjective value, the set of objective values, and a measure of pixel motion within at least one of the set of training videos, wherein the composite relationship specifies a level of contribution for at least one of the set of objective metrics to the perceptual video quality metric; and
  a perceptual quality calculator configured to:
    for a target video, calculate a first set of values for the set of objective metrics; and
    apply the composite relationship to the first set of values to generate an output value for the perceptual video quality metric.

20. The system of claim 19, wherein deriving the composite relationship comprises performing one or more training operations on the data sets.

21. A computer-implemented method for estimating perceptual video quality, the method comprising:
  for each training video included in a set of training videos, receiving a data set that describes the training video, wherein the data set includes a subjective value for a perceptual video quality metric, a measure of pixel motion within the training video, and a set of objective values for a set of objective metrics that includes an anti-noise signal-to-noise ratio, a detail loss measure, and a visual information fidelity measure;

from the data sets, deriving a composite relationship based on a correlation between the subjective value, the set of objective values, and the measure of pixel motion;

for a target video, calculating a first set of values for the motion and a first set of values for the set of objective metrics;

applying the composite relationship to the first set of values for the motion and the first set of values for the set of objective metrics to generate an output value for the perceptual video quality metric;

determining that a first motion value included in the first set of values for the motion exceeds a predetermined threshold; and modifying the output value for the perceptual quality metric based on an adjustment factor that is associated with the motion.

* * * * *